United States Patent
Mo

(10) Patent No.: US 9,707,867 B2
(45) Date of Patent: Jul. 18, 2017

(54) FIXING MECHANISM OF CHILD SAFETY CHAIR

(71) Applicant: Xiao-Long Mo, Guangdong (CN)

(72) Inventor: Xiao-Long Mo, Guangdong (CN)

(73) Assignee: BP Children's Products HK Co., Limited, Wanchai (HK)

( * ) Notice: Subject to any disclaimer, the term of this patent is extended or adjusted under 35 U.S.C. 154(b) by 105 days.

(21) Appl. No.: 13/759,047

(22) Filed: Feb. 5, 2013

(65) Prior Publication Data

US 2013/0200672 A1 Aug. 8, 2013

(30) Foreign Application Priority Data

Feb. 6, 2012 (CN) .......................... 2012 1 0025020

(51) Int. Cl.
*B60N 2/28* (2006.01)

(52) U.S. Cl.
CPC ......... *B60N 2/2821* (2013.01); *B60N 2/2887* (2013.01)

(58) Field of Classification Search
None
See application file for complete search history.

(56) References Cited

U.S. PATENT DOCUMENTS

| | | | | |
|---|---|---|---|---|
| 6,082,819 A * | 7/2000 | Jackson | ......................... | 297/253 |
| 6,209,957 B1 * | 4/2001 | Baloga et al. | ................. | 297/253 |
| 6,375,260 B1 * | 4/2002 | Hiramatsu et al. | ...... | 297/256.16 |
| 6,962,394 B2 * | 11/2005 | Anthony et al. | ............... | 297/253 |
| 7,338,120 B2 * | 3/2008 | Gastaldi | ......................... | 297/253 |
| 7,488,034 B2 * | 2/2009 | Ohren et al. | .............. | 297/216.11 |
| 7,810,220 B2 * | 10/2010 | Anthony et al. | .............. | 24/599.1 |
| 8,070,228 B2 * | 12/2011 | Karremans | .......... | B60N 2/2821 |
| | | | | 297/256.16 |
| 8,926,014 B2 * | 1/2015 | Su | ............... | 297/250.1 |
| 2002/0038968 A1 * | 4/2002 | Maier et al. | ................... | 297/253 |
| 2009/0243310 A1 * | 10/2009 | Buckingham | ........ | B60N 2/2806 |
| | | | | 292/215 |
| 2010/0072798 A1 * | 3/2010 | Clement | ....................... | 297/253 |

(Continued)

FOREIGN PATENT DOCUMENTS

CN WO 2014176909 A1 * 11/2014 .......... B60N 2/2887
EP  0 646 491 A1  4/1995

(Continued)

*Primary Examiner* — David E Allred
(74) *Attorney, Agent, or Firm* — Winston Hsu

(57) ABSTRACT

A fixing mechanism of a child safety chair is disclosed in the present invention. The fixing mechanism is disposed on a base of the child safety chair for connecting the child safety chair to a vehicle seat. The fixing mechanism includes a connecting frame, an engaging component and a driving component. An end of the connecting frame is connected to the base, a locking body is disposed on the other end of the connecting frame, and an opening is formed on the locking body. An end of the engaging component pivots to the connecting frame. The driving component is slidably disposed on the connecting frame and connected to the engaging component. The opening of the locking body is closed when the engaging component rotates into the locking body. Further, the opening of the locking body is opened when the driving component rotates the engaging component out of the locking body.

16 Claims, 11 Drawing Sheets

(56) References Cited

U.S. PATENT DOCUMENTS

| | | | |
|---|---|---|---|
| 2010/0247230 A1* | 9/2010 | Buckingham | B60N 2/2806 403/16 |
| 2011/0233374 A1 | 9/2011 | Clement | |
| 2011/0243653 A1* | 10/2011 | Buckingham | B60N 2/2806 403/322.4 |

FOREIGN PATENT DOCUMENTS

| | | |
|---|---|---|
| EP | 1 083 084 A2 | 3/2001 |
| EP | 1 083 084 A3 | 5/2003 |
| EP | 1 849 649 A1 | 10/2007 |
| JP | 2007290701 A | 11/2007 |

\* cited by examiner

FIXING MECHANISM OF CHILD SAFETY CHAIR

BACKGROUND OF THE INVENTION

1. Field of the Invention

The present invention relates to a fixing mechanism, and more particularly, to a fixing mechanism of a child safety chair disposed on the vehicle seat.

2. Description of the Prior Art

Child safety chair is stably disposed on the vehicle seat, and a child is belted in the child safety chair to provide preferred protection. Because the child safety chair can effectively decrease hurt that the child may be suffered during traffic accident, so that the child safety chair becomes a trend of consumer infant child product, and is widespread secure equipment. Accordingly, a fixing mechanism of the child safety chair, such as ISOFIX (International Standards Organization FIX) fixing mechanism, is an important structure that ensures firm connection between the child safety chair and the vehicle seat.

The ISOFIX fixing mechanism acceptable by automobile manufacturer is a current standard for the child safety chair of the vehicle seat. According to the said standard, assembly of the child safety chair is rapid and simple. An ISOFIX interface is disposed inside the vehicle by the automobile manufacturer, and an ISOFIX connector is set on the child safety chair by safety chair manufacturer. The child safety chair can be installed on the vehicle seat by connection of the ISOFIX interface and the ISOFIX connector, so that the child safety chair produced by different automobile manufacturer can be applied to the vehicle seat with the ISOFIX interface.

However, the ISOFIX connector of the conventional ISOFIX fixing mechanism is buckled with the ISOFIX interface of the vehicle to fix the child safety chair on the vehicle seat. The ISOFIX connector of the conventional ISOFIX fixing mechanism is easily disassembled from the ISOFIX interface of the vehicle seat when the vehicle is vibrated or hit accidently. Connection of the vehicle seat and the child safety chair with conventional fixing mechanism is unreliable, and security of the child sitting on the child safety chair is decreased. Besides, the ISOFIX connected buckled with the ISOFIX interface may be damaged easily due to the buckling mechanical assembly, which shortens serviceable life of the ISOFIX fixing mechanism and increases the maintenance cost.

SUMMARY OF THE INVENTION

The present invention provides a fixing mechanism to reliably dispose the child safety chair on the vehicle seat for solving above drawbacks. The fixing mechanism can effectively prevent connection of the fixing mechanism and a connecting component of a vehicle seat from damage so as to decrease maintenance cost.

According to the claimed invention, the fixing mechanism is disposed on a base of the child safety chair for connecting the child safety chair to the connecting component of the vehicle seat. The fixing mechanism includes a connecting frame, an engaging component and a driving component. An end of the connecting frame is connected to the base, a locking body is disposed on the other end of the connecting frame, and an opening is formed on the locking body. An end of the engaging component pivots to the connecting frame. The driving component is slidably disposed on the connecting frame and connected to the engaging component. The opening of the locking body is closed by the engaging component when the engaging component rotates into the locking body. Further, the opening of the locking body is opened by the engaging component when the driving component drives the engaging component to rotate out of the locking body.

According to the claimed invention, a hook portion is preferably disposed on the other end of the engaging component. A first resilient component is disposed between the driving component and the connecting frame. The first resilient component drives the hook portion to rotate into the locking body via the driving component so as to close the opening on the locking body. The driving component utilizes the resilient force of the first resilient component to provide power for the driving component, and the driving component drives the hook portion to rotate into the locking body, so as to simplify power provider of the driving component. Further, the hook portion can lock the engaging component to the connecting component inside the locking body more reliably.

According to the claimed invention, the first resilient component is preferably disposed inside the driving component. A first contacting part is disposed on an end of the first resilient component to contact against the driving component, and a second contacting part is disposed on the other end of the first resilient component to contact against the connecting frame. A sliding direction of the first contacting part relative to the driving component is located between the locking body and the second contacting part, so that the first resilient component is compressed to help the driving component for driving the hook portion to rotate into the locking body. Assembly of the first resilient component is simplified, and occupation space of the first resilient component inside the connecting frame is decreased.

According to the claimed invention, a sliding slot is preferably formed on the driving component along the sliding direction. A boss is disposed on an inner wall of an end of the sliding slot, and stretches from the inner wall toward an inner of the sliding slot. The connecting frame includes a contacting portion, and the first resilient component is disposed on the boss. Two ends of the first resilient component respectively contact against the contacting portion and the inner wall of the sliding slot, so as to decrease the occupation space of the first resilient component inside the connecting frame.

According to the claimed invention, a side of the hook portion adjacent to the connecting component inside the locking body is preferably an arc structure. A locking area is formed between the arc structure and a corresponding part of the engaging component. A side of the hook portion adjacent to the arc structure is inclined along a direction of the connecting component sliding into the locking area, so that the connecting component slides into the locking area smoothly, and an assembly of the hook portion relative to the connecting component inside the locking area is reliable.

According to the claimed invention, the fixing mechanism further preferably includes a second resilient component disposed on the connecting frame to constrain rotation of the engaging component. A first end of the second resilient component is connected to the connecting frame, and a second end of the second resilient component upwardly pushes the hook portion. The opening of the locking body is opened by the hook portion, and the connecting component smoothly inserts into the locking body.

According to the claimed invention, the fixing mechanism further includes a second resilient component disposed on the connecting frame. A first end of the second resilient component is connected to the connecting frame, and a second end of the second resilient component upwardly pushes the hook portion. The connecting component slides into the locking body to push the second end of the second resilient component, and the driving component utilizes a resilient force of the first resilient component to drive the hook portion to rotate into the locking body so as to close the opening on the locking body. The driving component further overcomes the resilient force of the first resilient component to drive the hook portion to rotate out of the locking body so as to open the opening on the locking body. The connecting component slides out of the locking body, and the second end of the second resilient component recovers to upwardly push the hook portion. Due to match of the first resilient component and the second resilient component, a pushing force from the second resilient component to the hook portion is substantially greater than the resilient force from the first resilient component to the hook portion via the driving component when the connecting component does not push the second end of the second resilient component, so the hook portion rotates out of the locking body to open the opening on the locking body, and the locking body is available to be inserted. When the connecting component slides into the locking body to separate the second end of the second resilient component from the hook portion, the first resilient component drives the driving component to rotate the hook portion into the locking body, so as to close the opening on the locking body and to lock the connecting component. In the meantime, the connecting component is pressed by the second end of the second resilient component, and the connecting component is tightly buckled. Therefore, the fixing mechanism can conveniently fix the child safety child on the connecting component of the vehicle seat, and further can provide preferred connection reliability between the child safety chair and the vehicle seat.

According to the claimed invention, the connecting frame includes a sheathing portion whereon the second resilient component is disposed. The sheathing portion is disposed on a side of the locking body opposite to the hook portion. The second resilient component can be conveniently connected to the connecting frame and provide the reliably pushing force to the hook portion via the sheathing portion.

According to the claimed invention, the connecting frame preferably pivots to the base. An accommodating space is formed inside the base to receive the connecting frame. The fixing mechanism of the present invention can be easily accommodated inside the base of the child safety chair to decrease occupation space of the child safety chair with the fixing mechanism for convenient transportation and assembly. Further, the driving component, the engaging component, the first resilient component and the second resilient component are received inside the connecting frame, and an operative hole is formed on the connecting frame for operation of the driving component, so the fixing mechanism of the present invention is exquisite.

For example, according to an embodiment of the present invention, the connecting frame includes a first casing, a second casing and a fixing component with a hollow structure. An end of the fixing component is immovably disposed inside the first casing, and the other end of the fixing component is immovably disposed inside the second casing. An end of the first casing pivots to the base, and the other end of the first casing is connected to an end of the second casing. A first sliding chamber is disposed on the other end of the second casing. The driving component slidably inserts into the hollow structure of the fixing component, and the driving component includes an operating portion stretching into the first casing. The operative hole formed on the first casing corresponds to the operating portion. The first resilient component is connected between the fixing component and the driving component. A second sliding chamber is disposed on the fixing component and faces the first sliding chamber, so that the first sliding chamber and the second sliding chamber are combined to form the locking body. The engaging component is received inside the hollow structure and pivots to the fixing component. The second resilient component is received inside the hollow structure and disposed on a position of the fixing component adjacent to the second sliding chamber. Due to the connecting frame formed by the first casing, the second casing and the fixing component, assembly of the driving component, the engaging component, the first resilient component and the second resilient component received inside the connecting frame is easy and convenient.

According to the other embodiment of the present invention, the driving component includes a first indicating component and a second indicating component. A window is formed on the connecting frame accordingly, so the first indicating component can face the window when the opening on the locking body is closed by the hook portion, and the second indicating component can face the window when the opening on the locking body is opened by the hook portion. User can easily control operation condition of the fixing mechanism and the connecting component of the vehicle.

At the time, the connecting frame includes a first casing, a second casing and a fixing component with the hollow structure. An end of the fixing component is disposed inside the first casing, and the other end of the fixing component is immovably disposed inside the second casing. An end of the first casing pivots to the base, and the other end of the first casing is buckled with an end of the second casing. A first sliding chamber is disposed on the other end of the second casing. The driving component slidably inserts into the hollow structure of the fixing component. The driving component includes an operating portion stretching into the first casing. The operative hole formed on the first casing corresponds to the operating portion. The window is formed on the second casing. The first resilient component is connected between the fixing component and the driving component. A second sliding chamber is disposed on the fixing component and faces the first sliding chamber, so that the first sliding chamber and the second sliding chamber are combined to form the locking body. The engaging component is received inside the hollow structure and pivots to the fixing component. The second resilient component is received inside the hollow structure and disposed on a position of the fixing component adjacent to the second sliding chamber. Due to the connecting frame formed by the first casing, the second casing and the fixing component, assembly of the driving component, the engaging component, the first resilient component and the second resilient component received inside the connecting frame is easy and convenient. Because the first casing is buckled with the second casing, assembly and disassembly of the casings can be operated rapidly.

According to the claimed invention, a slotted hole is preferably formed on a position of the engaging component different from a pivot center of the engaging component. The driving component includes a pushing portion movably matched with the slotted hole. The driving component can rotate the engaging component during slide, so as to simplify structural design of the driving component for rotation of the engaging component.

According to the claimed invention, a rib is preferably disposed on the driving component and stretches toward the engaging component, and a positioning slot is formed on the engaging component accordingly. The rib slides into the positioning slot to constrain rotation of the engaging component when the opening on the locking body is closed by the engaging component. The rib further slides out of the positioning slot to release rotary constraint of the engaging component when the opening on the locking body is opened by the engaging component. Due to a combination of the rib and the positioning slot, the fixing mechanism provides reliable locking function when the engaging component closes the opening on the locking body, so that the engaging component can lock the connecting component inside the locking body reliably, to effectively increase connection reliability between the fixing mechanism and the connecting component of the vehicle seat.

In the present invention, the end of the engaging component pivots to the connecting frame, and the driving component is slidably disposed on the connecting frame and connected to the engaging component. The engaging component rotates into the locking body to close the opening on the locking body and to lock the connecting component inside the locking body. The driving component drives the engaging component to rotate out of the locking body, so as to open the opening on the locking body and to take the connecting component away. Thus, the engaging component of the fixing mechanism of the present invention can lock the connecting component of the vehicle seat in a rotatable manner, which replaces the conventional buckling method between ISOFIX interface of the vehicle and ISOFIX connector of ISOFIX fixing mechanism. The present invention not only increases the connection reliability between the child safety chair and the vehicle seat, but also effectively prevents the engaging component and the connecting component from damage for economy of the maintenance cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
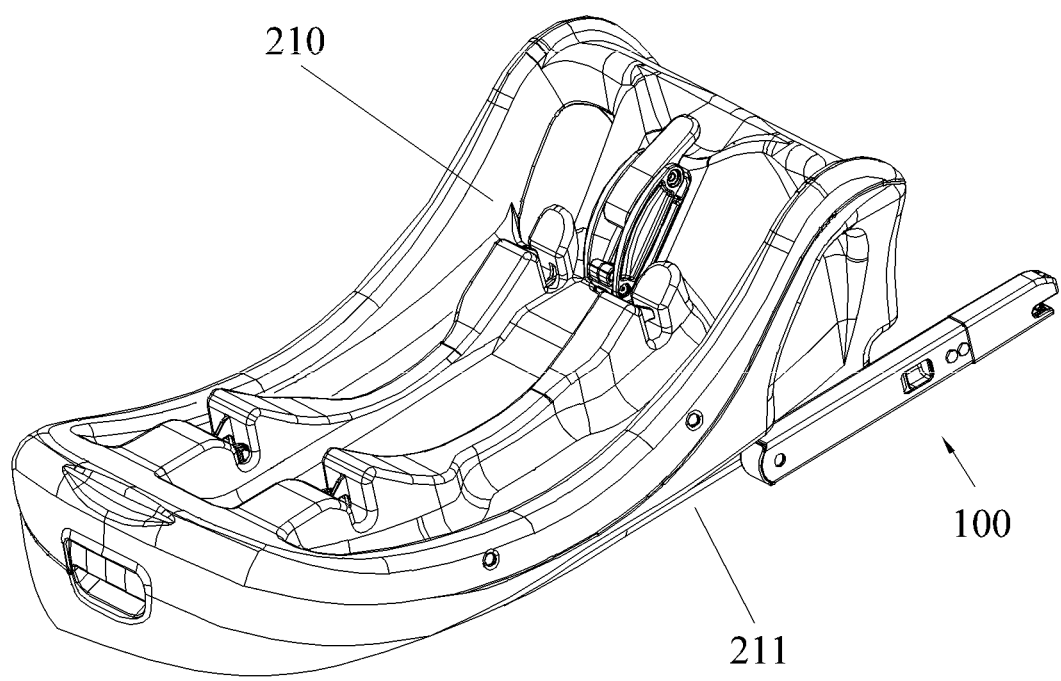
FIG. 1 is a diagram of a fixing mechanism and a base of a child safety chair according to a first embodiment of the present invention.
Figure 2:
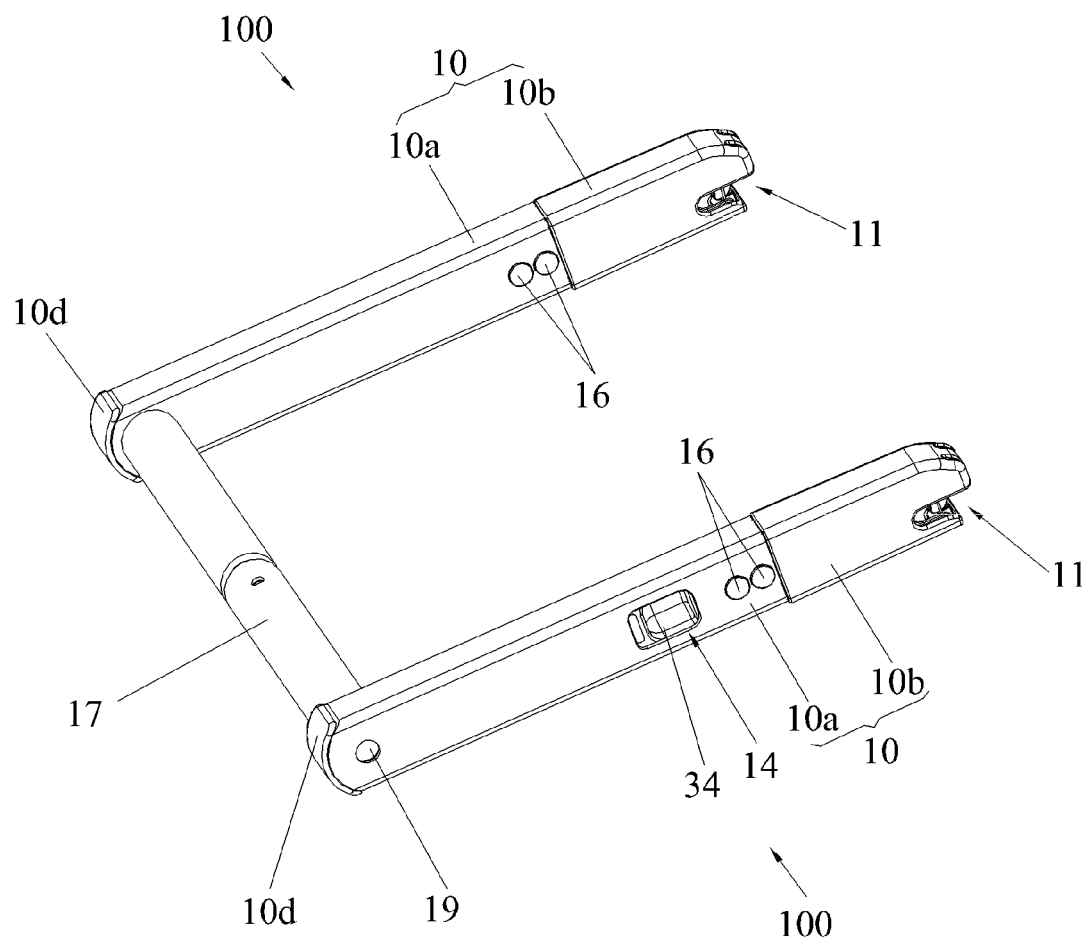
FIG. 2 is a diagram of the fixing mechanism shown in FIG. 1.
Figure 3:
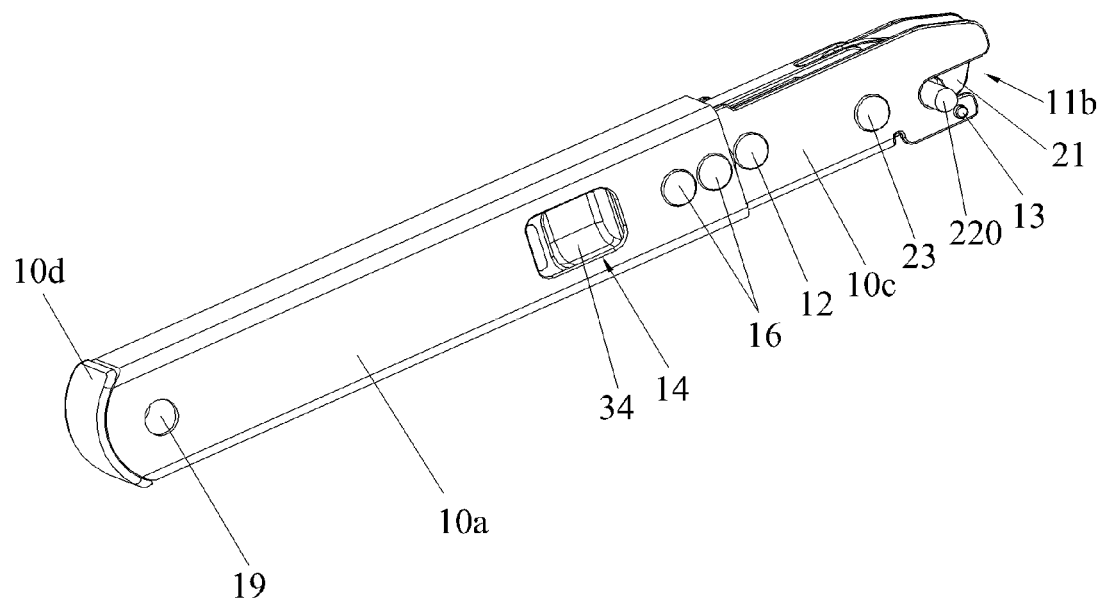
FIG. 3 is a diagram of the fixing mechanism without a second casing shown in FIG. 2.

Please refer to FIG. 1. FIG. 1 is a diagram of a fixing mechanism 100 disposed on a base 210 of the child safety chair according to a first embodiment of the present invention. As shown in FIG. 1 and FIG. 2, two fixing mechanisms 100 of this embodiment are disposed on the base 210 of the child safety chair. Front ends of the fixing mechanisms 100 are connected to each other via the pivot shaft 17, and the front ends of the fixing mechanisms 100 can respectively pivot to a left side and right side of the base 210 of the child safety chair by the pivot shaft 17, so that the fixing mechanisms 100 can simultaneously rotate relative to the base 210 of the child safety chair. The fixing mechanism 100 of the present invention can move out of or move into the base 210 of the child safety chair according to user's demand, to effectively decrease occupation space of the base 210 of the child safety chair for convenient storage and transportation of the base 210 of the child safety chair.

Please refer to FIG. 1 to FIG. 5. The fixing mechanism 100 of the present invention includes a connecting frame 10, an engaging component 20 and a driving component 30. A front end of the connecting frame 10 is connected to the base 210. In detail, the front end of the connecting frame 10 pivots to the base 210 via the pivot shaft 17, the connecting frame 10 can be received inside the base 210, and an accommodating space 211 is formed on the base 210 to store the connecting frame 10. The fixing mechanism 100 of the present invention can be accommodated inside the base 210 of the child safety chair to decrease volume of the child safety chair with the fixing mechanism 100 for convenient transportation and assembly. A locking body 11 whereon an opening is formed is disposed on a rear end of the connecting frame 10. A front end of the engaging component 20 pivots to the connecting frame 10. In this embodiment, a hook portion 21 is disposed on a rear end of the engaging component 20. The hook portion 21 stretches toward the locking body 11 and is bent into the locking body 11. The driving component 30 is slidably disposed on the connecting frame 10 and connected to the engaging component 20. A slotted hole 22 is formed on a position of the engaging component 20 different from a pivot center of the engaging component 20. The driving component 30 includes a pushing portion 33, and the pushing portion 33 can correspond to the slotted hole 22. The pushing portion 33 passes through the slotted hole 22 and is movably matched with the slotted hole 22, so that the driving component 30 can drive the hook portion 21 to rotate relative to a position where the engaging component 20 pivots to the connecting frame 10 during slide of the driving component 30, so as to effectively simplify structural design of the driving component 30 for rotation of the hook portion 21. For preferred reliability of the driving component 30 relative to the engaging component 20, two buckling blocks 35 are disposed on the front end of the driving component 30 and outwardly stretch in an opposite parallel arrangement. The pushing portion 33 passes through the slotted hole 22, two ends of the pushing portion 33 are fixed on the buckling blocks 35, and the engaging component 20 is located between the two buckling blocks 35. When the fixing mechanism 100 is close to the connecting component 220 of the vehicle seat and the connecting component 220 slides into the locking body 11, the hook portion 21 rotates into the locking body 11 to close the opening on the locking body 11, so that the hook portion 21 locks the connecting component 220 inside the locking body 11. When the driving component 30 drives the hook portion 21 to rotate out of the locking body 11, the opening on the locking body 11 is opened by the hook portion 21 of the engaging component 20, so that the hook portion 21 releases lock of the connecting component 220 inside the locking body 11. Thus, the connecting component 220 can be separated from the blocking body 11 to disassemble the child safety chair.

For preferred operating performance of the driving component 30, the fixing mechanism 100 of this embodiment includes a first resilient component 40 for sliding the driving component 30 toward the locking body 11. The first resilient component 40 is connected between the driving component 30 and the connecting frame 10, and the first resilient component 40 drives the driving component 30 to rotate the hook portion 21 into the locking body 11, so as to close the opening on the locking body 11. The driving component 30 utilizes resilient force of the first resilient component 40 to rotate the hook portion 21 into the locking body 11, so that the hook portion 21 can automatically rotate into the locking body 11 to close the opening on the locking body 11. For releasing the lock mode of the connecting component 220, the driving component 30 is pushed at a direction away from the locking body 11. Movement of the driving component 30 drives the hook portion 21 of the engaging component 20 to rotate out of the locking body 11 so as to open the opening on the locking body 11, which means the locking body 11 is availably opened without restriction. In the meantime, the connecting component 220 can slide out of the locking body 11. As mentioned above, the driving component 30 can utilize the resilient force of the first resilient component 40 to drive the hook portion 21 to rotate into the locking body 11 to close the opening on the locking body 11 when the connecting component 22 slides into the locking body 11. The connecting component 220 inside the locking body 11 is locked by the hook portion 21 to connect the child safety chair onto the vehicle seat.

In order to prevent the locking body 11 from opening when the hook portion 21 is not engaged with the connecting component 220, the fixing mechanism 100 of the present invention further includes a second resilient component 70, which is disposed on the connecting frame 10. A first end 71 of the second resilient component 70 is immovably connected to the connecting frame 10, and a second end 72 of the second resilient component 70 pushes the hook portion 21 upwardly. In detail, the second end 72 of the second resilient component 70 is suspended and separately connected to the hook portion 21. The second end 72 can rotate along a direction opposite to a rotary direction of the hook portion 21 that moves into the locking body 11. When the connecting component 220 does not insert into the locking body 11, the second end 72 overcomes the resilient force of the first resilient component 40 to upwardly push the hook portion 21 inside the locking body 11, the hook portion 21 rotates out of the locking body 11 to open the opening on the locking body 11. When the connecting component 220 slides into the locking body 11 to push the second end 72, the second end 72 is separated from the hook portion 21, the driving component 30 utilizes the resilient force of the first resilient component 40 to rotate the hook portion 21 into the locking body 11, so as to close the opening on the locking body 11 and to lock the connecting component 220 inside the locking body 11 by the hook portion 21. The driving component 30 can overcome the resilient force of the first resilient component 40 to rotate the hook portion 21 out of the locking body 11, so as to open the opening on the locking body 11 by a movement of the hook portion 21 and to release the lock of the hook portion 21 relative to the connecting component 220 inside the locking body 11. At the time, the second end 72 can slide the connecting component 220 out of the locking body 11 by the resilient recovering force of the second resilient component 70. The second end 72 recovers to upwardly push and contact the hook portion 11, so that the hook portion 21 keeps at the position out of the locking body 11. Further, the first end 71 of the second resilient component 70 is connected to the connecting frame 10, the second end 72 of the second resilient component 70 upwardly pushes the hook portion 21 of the engaging component 20, and rotation of the engaging component 20 and rotation of the engaging component 20 by the first resilient component 70 are constrained. By way of the first resilient component 40 and the second resilient component 70, a pushing force of the second resilient component 70 relative to the hook portion 21 is substantially greater than the resilient force of the first resilient component 40 applied to the hook portion 21 via the driving component 30 when the connecting component 220 does not push the second end 72 of the second resilient component 70, so that the hook portion 21 rotates out of the locking body 11 to open the opening on the locking body 11, and the locking body 11 is availably opened. When the connecting component 220 slides into the locking body 11 to separate the second end 72 of the second resilient component 70 from the hook portion 21, the first resilient component 40 pushes the driving component 30 to rotate the hook portion 21 into the locking body 11, so as to close the opening on the locking body 11 by the hook portion 21 and to lock the hook portion 21 onto the connecting component 220. The connecting component 220 inside the locking body 11 is pressed by the second end 72 of the second resilient component 70, and the connecting component 220 is tightly buckled to increase the connection reliability between the child safety chair and the vehicle seat. In this embodiment, the first resilient component 40 can preferably be the compression spring to decrease occupation space of the first resilient component 40 relative to the connecting frame 10. The first resilient component 40 also can be the expansion spring. The second resilient component 70 can preferably be the torsional spring to simplify structure of the second resilient component 70.

Figure 6:
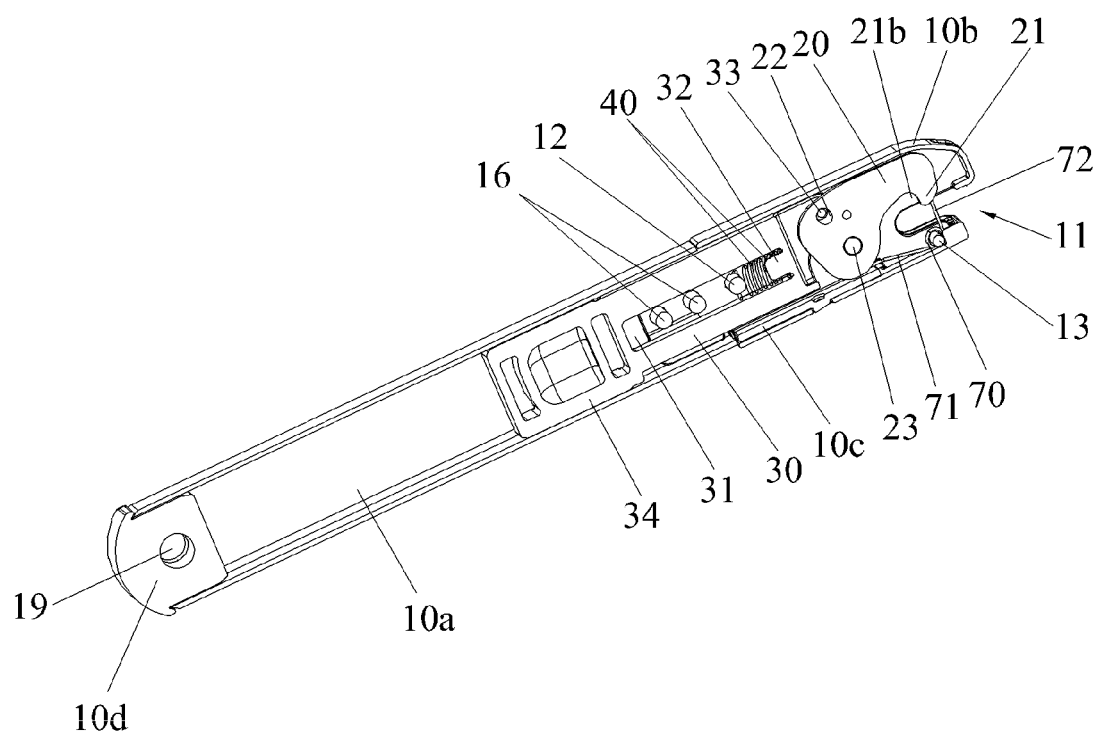
FIG. 6 is a diagram of the fixing mechanism in an unlock mode according to the first embodiment of the present invention.
Figure 7:
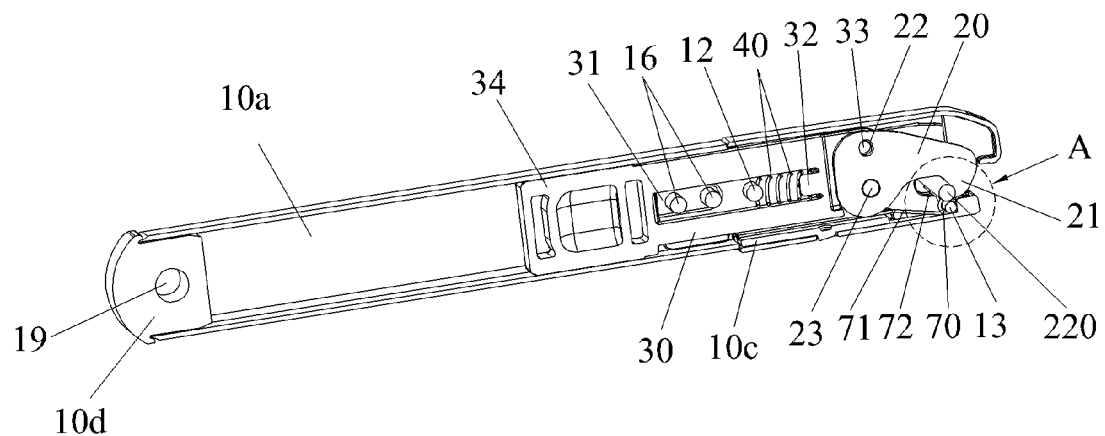
FIG. 7 is a diagram of the fixing mechanism in a lock mode according to the first embodiment of the present invention.

As shown in FIG. 6 and FIG. 7, the first resilient component 40 is disposed inside the driving component 30. A first contacting part (not shown in figures) is disposed on the front end of the first resilient component 40 to contact against the driving component 30. A second contacting part (not shown in figures) is disposed on the rear end of the first resilient component 40 to contact against the connecting frame 40. A sliding direction of the first contacting part relative to the driving component 30 is located between the locking body 11 and the second contacting part, so that the first resilient component 40 is compressed to provide the resilient force for rotation of the hook portion 21 into the locking body 11 via the driving component 30. Assembly of the first resilient component 40 is simplified and occupation space of the first resilient component 40 inside the connecting frame 10 is decreased. Method of disposing the first resilient component 40 inside the driving component 30 is described as follow. A sliding slot 31 is formed on the driving component 30 along the sliding direction of the driving component 30. A boss 32 is disposed on an inner wall of a rear end of the sliding slot 31, and the boss 32 stretches from the inner wall toward inner of the sliding slot 31. The connecting frame 10 includes a contacting portion 12. The contacting portion 12 protrudes from a wall of the connecting frame 10 and stretches along a direction that the contacting portion 12 passes through the sliding slot 31, which means a structural direction of the contacting portion 12 is perpendicular to the sliding direction of the driving component 30. The contacting portion 12 is formed by a riveting component disposed on the connecting frame 10, for example, the contacting portion 12 can be a rivet. The first resilient component 40 is disposed on the boss 32; in the meanwhile, two ends of the first resilient component 40 respectively contacts against the inner wall of the sliding slot 31 and the contacting portion 12, so as to decrease the occupation space of the first resilient component 40 inside the connecting frame 10.

The connecting frame 10 includes a sheathing portion 13 for the second resilient component 70. The sheathing portion 13 is disposed on a position of the connecting frame 10 adjacent to the locking body 11. The sheathing portion 13 can be an axle or a pillar formed on the connecting frame 10. The sheathing portion 13 is located on a side of the locking body 11 opposite to the hook portion 21. The second resilient component 70 can be conveniently disposed on the connecting frame 10 via the sheathing portion 13, so as to provide reliable pushing force to the hook portion 21. In this embodiment, a side of the hook portion 21 adjacent to the connecting component 220 inside the locking body 11 is an arc structure 21*a*. A locking area 21*b* is formed between the arc structure 21*a* and a corresponding part of the engaging component 20. A side of the hook portion 21 adjacent to the arc structure 21*a* is inclined along a direction that the connecting component 220 slides into the locking area 21*b*. Thus, the connecting component 220 slides into the locking area 21*b* smoothly, and the second end 72 of the second resilient component 70 can be reliably separated from the hook portion 21 by the connecting component 220.

Figure 4:
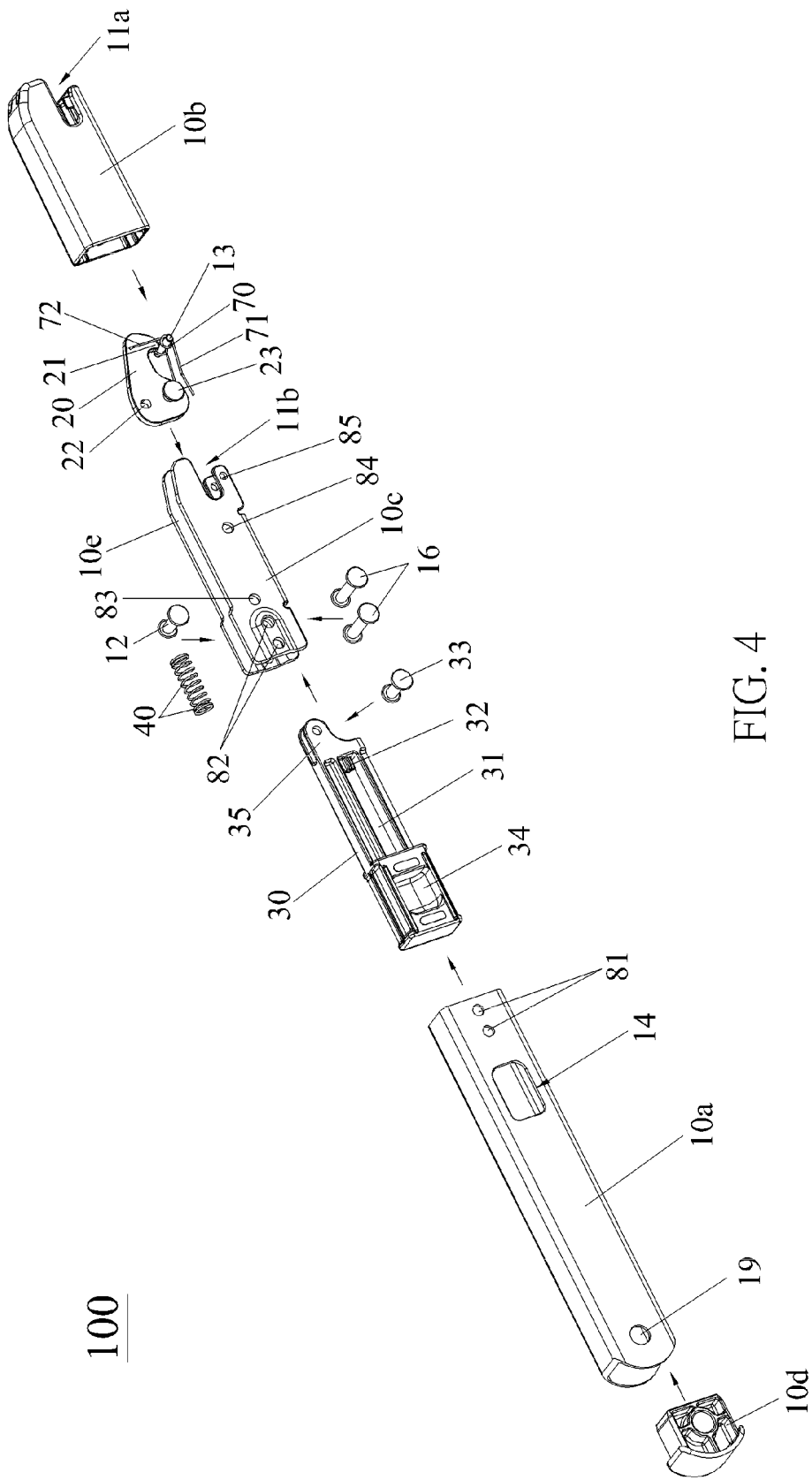
FIG. 4 is an exploded diagram of the fixing mechanism shown in FIG. 2.
Figure 5:
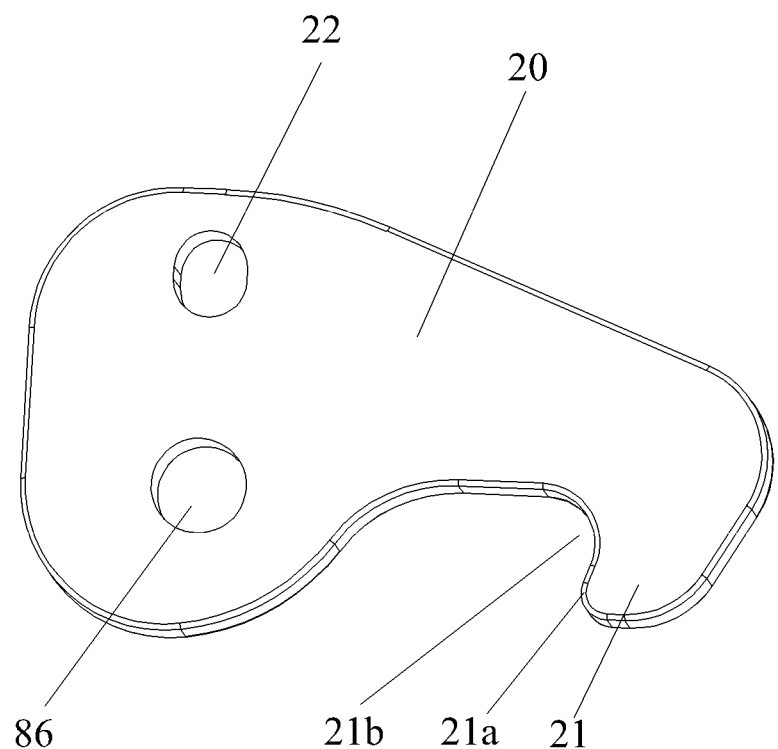
FIG. 5 is a diagram of an engaging component of the fixing mechanism of the present invention.

Please refer to FIG. 4, FIG. 6 and FIG. 7. The driving component 30, the engaging component 20, the first resilient component 40 and the second resilient component 70 are received inside the connecting frame 10 for preferred structural design of the fixing mechanism 100 of the present invention, and an operative hole 14 is formed on the connecting frame 10 for operation of the driving component 30. The driving component 30 can be operated manually by user via the operative hole 14. Method of accommodating the driving component 30, the engaging component 20, the first resilient component 40 and the second resilient component 70 is described as follow.

The connecting frame 100 includes a first casing 10*a*, a second casing 10*b* and a fixing component 10*c* with a hollow structure 10*e*. A front end of the fixing component 10*c* is immovably disposed inside the first casing 10*a*. A first fixing hole 81 is formed on a rear end of the first casing 10*a*, and a second fixing hole 82 is formed on the front end of the fixing component 10*c* accordingly. When the front end of the fixing component 10*c* is disposed on the first casing 10*a*, the first fixing hole 81 aligns with the second fixing hole 82, and two ends of a first riveting component 16 passes through the second fixing hole 82 and the first fixing hole 81 in sequence to be fixed on the first casing 10*a*. In this embodiment, the fixing mechanism 100 can include two first riveting components 16 or less or more. An amount of the first riveting component 16 is not limited to the above-mentioned embodiment, and detailed description is omitted herein for simplicity. The rear end of the fixing component 10*c* is immovably disposed inside the second casing 10*b*, for example, the rear end of the fixing component 10*c* is buckled with the second casing 10*b*.

The front end of the first casing 10*a* pivots to the base 210. An installing hole 19 is formed on the front end of the first casing 10*a*, and a cover 10*d* inserts into the front end of the first casing 10*a*. When an end of the pivot shaft 17 inserts into the installing hole 19 to further pass through the cover 10*d* and to be fixed on the front end of the first casing 10*a*, the other end of the pivot shaft 17 is disposed on the base 20 for pivot connection between the base 210 and the front end of the first casing 10*a*. Besides, the rear end of the first casing 10*a* is connected to the front end of the second casing 10*b*. A first sliding chamber 11*a* is disposed on the rear end of the second casing 10*b*.

The driving component 30 slidably inserts into the hollow structure 10*e* of the fixing component 10*c*. The first riveting component 16 passes through the sliding slot 31 on the driving component 30. Relative position of the first riveting component 16 and the sliding slot 31 is shown in FIG. 6 and FIG. 7, which has an aim to prevent slide of the driving component 30 from block by the first riveting component 16. The first riveting component 16 is utilized to fix the first casing 10*a* and the fixing component 10*c*. The driving component 30 includes an operating portion 34 stretching into the first casing 10*a*. The operative hole 14 formed on the first casing 10*a* corresponds to the operating portion 34, so the user can operate the driving component 30 via the operating portion 34 conveniently.

The first resilient component 40 is connected between the fixing component 10*c* and the driving component 30. In detail, a third fixing hole 83 is formed on the fixing component 10*c* and located by a rear side of the second fixing hole 82. The contacting portion 12 passes through the sliding slot 31 on the driving component 30 inside the hollow structure 10*e*, and two ends of the contacting portion 12 pass through the third fixing hole 83 to be fixed on the fixing component 10*c*. At the time, the boss 32 of the driving component 30 is located at the rear end of the contacting portion 12. Relative position of the contacting portion 12 and the boss 32 is shown in FIG. 6 and FIG. 7. The first resilient component 40 is received inside the sliding slot 31, the front end of the first resilient component 40 contacts against the contacting portion 12, and the rear end of the first resilient component 30 is disposed on the boss 32 to contact against the inner wall of the sliding slot 31. A second sliding chamber 11*b* is disposed on the fixing component 10*c* and faces the first sliding chamber 11*a*. The second sliding chamber 11*b* and the first sliding chamber 11*a* are combined to form the locking body 11.

Final, the front end of the engaging component 20 is received inside the hollow structure 10*e*, and the front end of the engaging component 20 pivots to the fixing component 10*c*. In detail, a fourth fixing hole 84 is formed on the fixing component 10*c* and located by a rear side of the third fixing hole 83. A sixth fixing hole 86 is formed on the engaging component 20 accordingly. When the engaging component 20 is assembled with the fixing component 10*c* and the fourth fixing hole 84 aligns with the sixth fixing hole 86, two ends of the pivot axle 23 pass through the sixth fixing hole 86 and the fourth fixing hole 84 in sequence, and the ends of the pivot axle 23 are fixed on the fixing component 10*c* to achieve a purpose of pivoting the front end of the engaging component 24 to the fixing component 10*c*. Further, the second resilient component 70 is received inside the hollow structure 10*e*, and disposed on a position of the fixing component 10*c* adjacent to the second sliding chamber 11b. In detail, a fifth fixing hole 85 is formed on the rear end of the fixing component 10c adjacent to the second sliding chamber 11b, and located by a rear side of the fourth fixing hole 84. Two ends of the sheathing portion 13 pass through the fifth fixing hole 85 to be fixed on the fixing component 10c. The second resilient component 70 is disposed on the sheathing portion 13 so that the second end 72 of the second resilient component 70 can upwardly push the hook portion 21. The first end 71 of the second resilient component 70 is immovably connected to the second casing 10b. By the connecting frame 10 composed of the first casing 10a, the second casing 10b and the fixing component 10c, assembly of the driving component 30, the engaging component 20, the first resilient component 40 and the second resilient component 70 received inside the connecting frame is executed conveniently.

Figure 8:
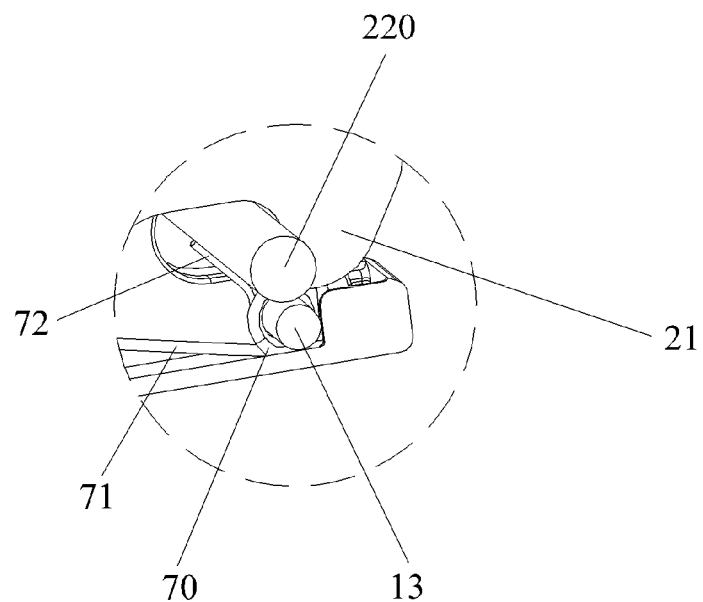
FIG. 8 is an enlarged diagram of part A shown in FIG. 7.

Working principle of the fixing mechanism of the child safety chair in this embodiment is introduced as shown in FIG. 6 to FIG. 8, the connecting component 220 of the vehicle seat moves close to the locking body 11 when the child safety chair intends to be assembled with the vehicle seat. Because the connecting component 220 does not push the second end 72 of the second resilient component, the pushing force of the second end 72 relative to the hook portion 21 is substantially greater than the resilient force of the first resilient component 40 applied to the hook portion 21 via the driving component 30, so that the hook portion 21 rotates out of the locking body 11 and the locking body 11 is availably opened, as shown in FIG. 6. The child safety chair is conveniently assembled with the vehicle seat. At the time, the first resilient component 40 is compressed to provide force for slide of the driving component 30. When the connecting component 220 of the vehicle seat slides into the locking body 11 and pushes the second end 72 of the second resilient component 70 toward the driving component 30 (or toward the first end 71 of the second resilient component 70), the second end 72 rotates to separate from the hook portion 21, and the resilient force of the first resilient component 40 drives the driving component 30 to rotate the hook portion 21 into the locking body 11 to close the opening on the locking portion 21. The connecting component 220 inside the locking body 11 is locked by the hook portion 21. The connecting component 220 is pressed by the locking force of the hook portion 21 and the contacting force of the second end 72 of the second resilient component 70, so that the connecting component 220 can be reliably locked between the hook portion 21 and the second end 72 of the second resilient component 70 as shown in FIG. 7 and FIG. 8, and the child safety chair is assembled with the vehicle seat completely. For separation of the child safety chair from the connecting component 220, the driving component 30 slides along the direction away from the locking body 11. The driving component 30 drives to the hook portion 21 to rotate out of the locking body 11 to open the opening on the locking body 11. The locking body 11 is availably opened. At the time, the first resilient component 40 is compressed to store the resilient recovering force. The connecting component 220 slides out of the locking body 11 to separate from the second end 72 of the second resilient component 70. The second end 72 of the second resilient component 70 can recover according to the own resilient force. The recovering second end 72 further provides force to slide the connecting component 220 out of the locking body 11. When the second end 72 contacts against the hook portion 21, the hook portion 21 out of the locking body 11 is pushed upwardly and the locking body 11 is availably opened once again, as shown in FIG. 6, and ready for the next working operation.

Figure 9:
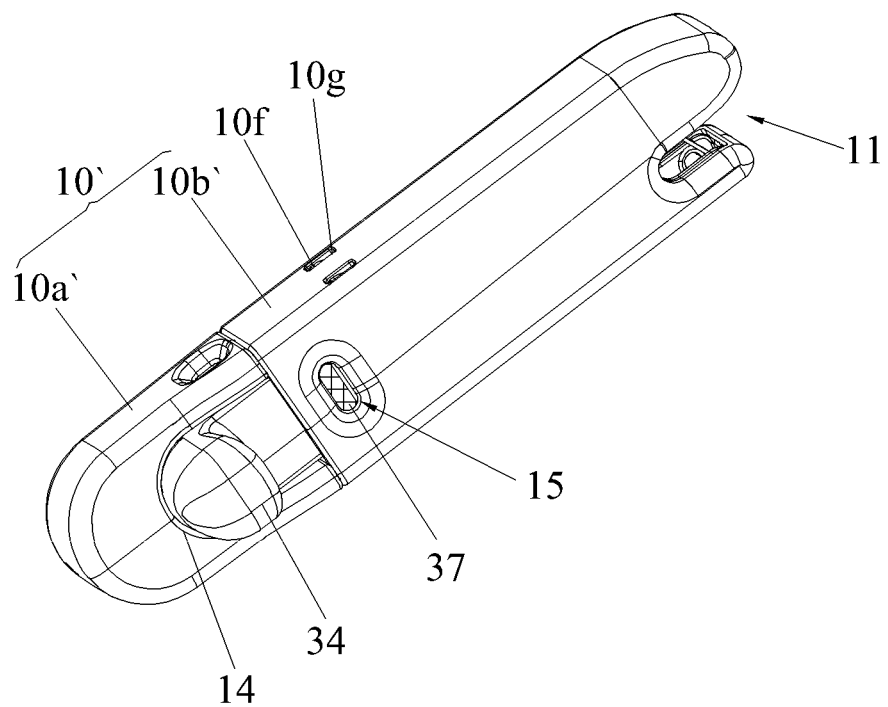
FIG. 9 is a diagram of the fixing mechanism according to a second embodiment of the present invention.
Figure 10:
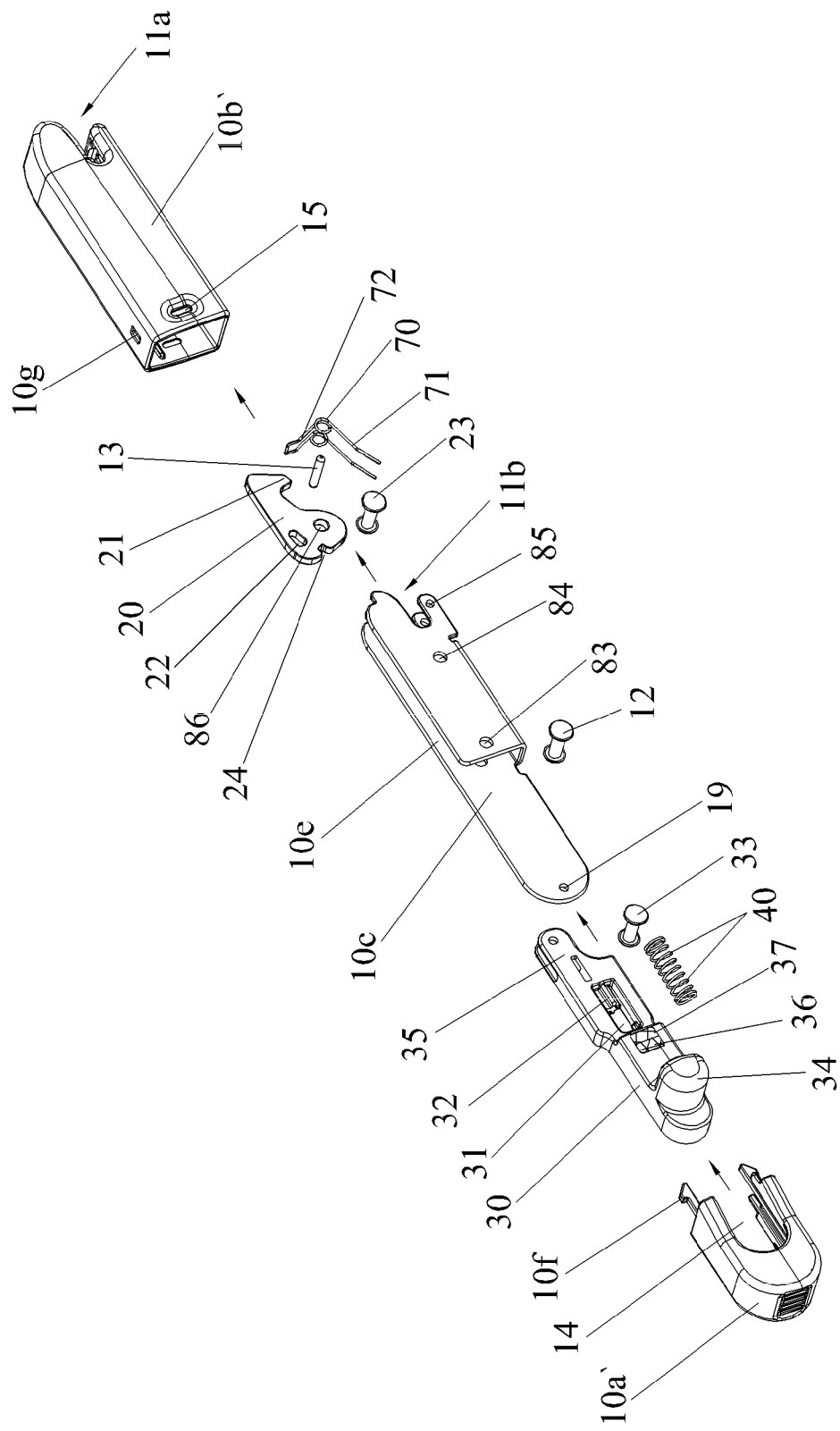
FIG. 10 is an exploded diagram of the fixing mechanism shown in FIG. 9.

Please refer to FIG. 9. FIG. 9 is a diagram of the fixing mechanism 100' of the child safety chair according to a second embodiment of the present invention. The fixing mechanism 100' of the second embodiment is described as shown in FIG. 9 to FIG. 12. Structure of the fixing mechanism 100' is basically similar to structure of the fixing mechanism 100. Difference between the first embodiment and the second embodiment is illustrated as follow.

Comparing to the fixing mechanism 100 of the first embodiment, the fixing mechanism 100' of the second embodiment includes a rib 38 disposed on the driving component 30. The rib 38 stretches from the driving component 30 toward the engaging component 20. A positioning slot 24 is formed on the engaging component 20 accordingly. When the opening on the locking body 11 is closed by the hook portion 21 of the engaging component 20, the rib 38 slides into the positioning slot 24 to constrain rotation of the engaging component 20. When the rib 38 slides out of the positioning slot 24 to release the rotary constraint of the engaging component 20, the opening on the locking body 11 is opened by the hook portion 21 of the engaging component 20. Therefore, the engaging component 20 of the fixing mechanism 100' of the second embodiment can lock the connecting component 220 inside the locking body 11 more reliably, to effectively increase the connection reliability of the fixing mechanism 100' and the connecting component 220 of the vehicle seat. Besides, the positioning slot 24 is located between the slotted hole 22 and the pivot axle 23.

Comparing to the fixing mechanism 100 of the first embodiment, the fixing mechanism 100' of the second embodiment further includes a first indicating component 36 and a second indicating component 37. A window 15 is formed on the connecting frame 10' accordingly and located by a rear side of the operative hole 14. When the opening on the locking body 11 is closed by the hook portion 21, the first indicating component 36 faces the window 15. When the opening on the locking body 11 is opened by the hook portion 21, the second indicating component 37 faces the window 15. Thus, user can easily control operation condition of the fixing mechanism 100' and the connecting component 220 of the vehicle seat by a combination of the indicating components 36, 37 and the window 15.

Assembly relation of the first casing 10a' and the second casing 10b' of the connecting frame 10' of the second embodiment is different from assembly relation of the first casing 10a and the second casing 10b of the connecting frame 10 of the first embodiment. In the second embodiment, a buckling clasp 10f is disposed on the rear end of the first casing 10a', and a buckling hole 10g is formed on the front end of the second casing 10b' accordingly. When the rear end of the first casing 10a' inserts into the front end of the second casing 10b', the buckling clasp 10f is engaged inside the buckling hole 10g, so that the first casing 10a' is buckled with the second casing 10b' by matched engagement of the buckling clasp 10f and the buckling hole 10g, which means the rear end of the first casing 10a' is connected to the front end of the second casing 10b' in a buckling manner. Accordingly, the first casing 10a' is not necessary to connect the fixing component 10c, so that the first fixing hole cam be omitted from the first casing 10a' for connection of the fixing component 10c, the second fixing hole cam be omitted from the fixing component 10c, and the first riveting component can be omitted further. In addition, the cover can be omitted, and the installing hole formed on the front end of the fixing component 10c inside the first casing 10a' (not formed on the first casing 10a') can also be omitted, so structure of the connecting frame 10' of the second embodiment is simplified. The window 15 is formed on the second casing 10b'.

Figure 11:
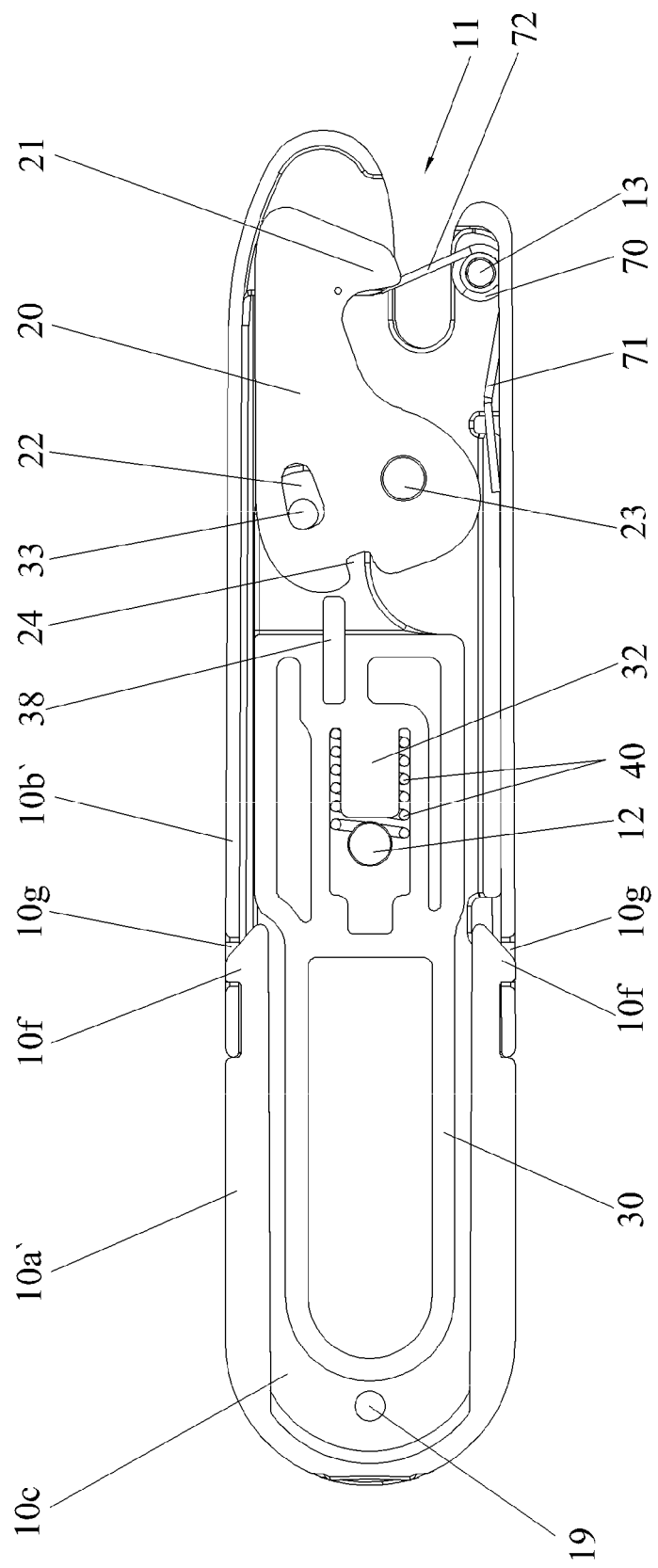
FIG. 11 is a diagram of the fixing mechanism in the unlock mode according to the second embodiment of the present invention.
Figure 12:
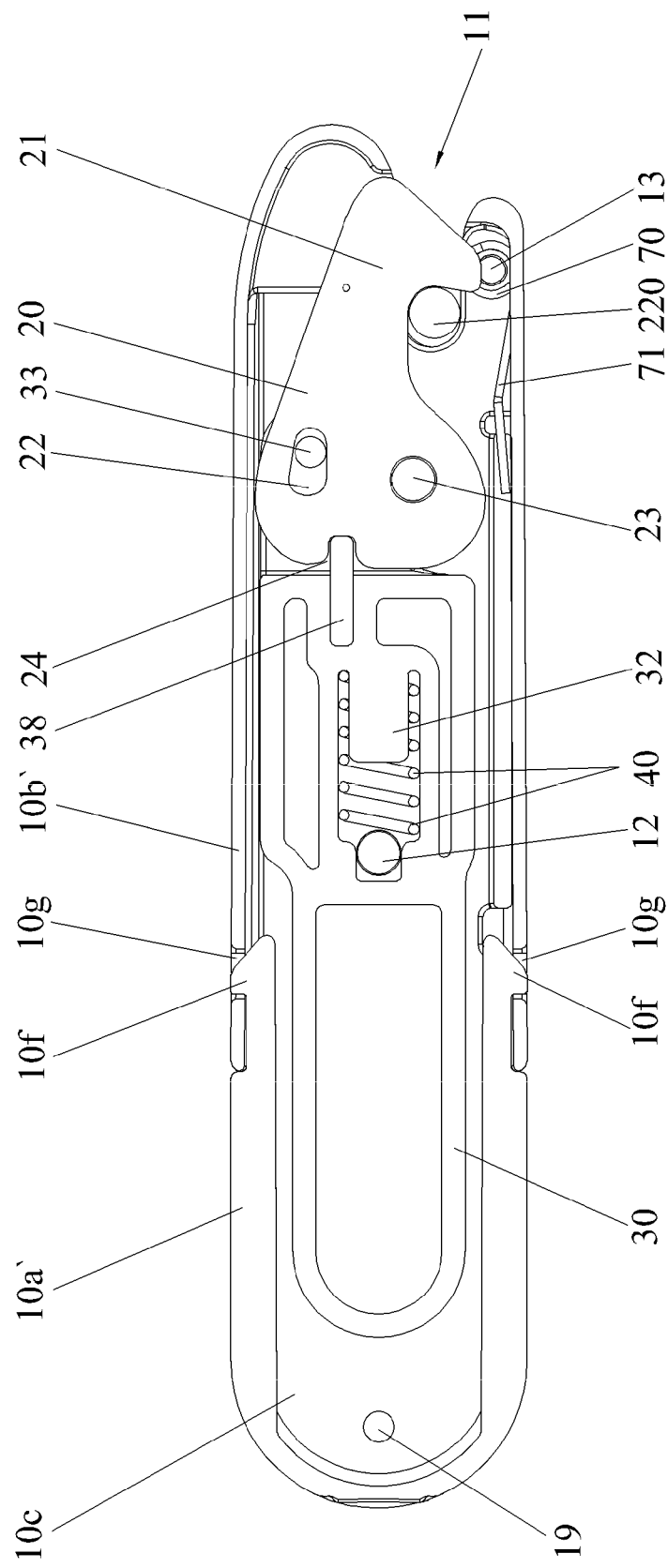
FIG. 12 is a diagram of the fixing mechanism in the lock mode according to the second embodiment of the present invention.

Working principle of the fixing mechanism 100' of the second embodiment is described as shown in FIG. 11 and FIG. 12. The fixing mechanism 100' of the second embodiment not only has the same working principle as the fixing mechanism 100 of the first embodiment, but also provides positioning function and indicating function. For example, when the hook portion 21 rotates into the locking body 11 to close the opening on the locking body 11, the rib 38 slides into the positioning slot 24 to position the engaging component 20; in the meanwhile, the first indicating component 36 faces the window 15 for prompt that the hook portion 21 has locked the connecting component 220 inside the locking body 11. When the rib 38 slides out of the positioning slot 24 to release the rotary constraint of the engaging component 20, the hook portion 21 rotates out of the locking body 11 to open the opening on the locking body 11; in the meanwhile, the second indicating component 37 faces the window 15 for the prompt that the connecting component 220 can be disassembled from the fixing mechanism 100' of the child safety chair.

An end of the engaging component 20 of the present invention pivots to the connecting frame 10 (or the connecting frame 10'), the driving component 30 is slidably disposed on the connecting frame 10 (or the connecting frame 10') and connected to the engaging component 20. When the engaging component 20 rotates into the locking body 11, the opening on the locking body 11 is closed and the connecting component 220 inside the locking body 11 is locked by the engaging component 20. When the driving component 30 drives the engaging component 20 to rotate out of the locking body 11, the opening on the locking body 11 is opened by the engaging component 20 for taking the connecting component 220 away from the locking body 11 conveniently. Therefore, the engaging component 20 of the fixing mechanism 100 (or the fixing mechanism 100') of the present invention can lock the connecting component 220 of the vehicle seat in the rotary manner, which replaces the conventional buckling method between ISOFIX interface of the vehicle seat and ISOFIX connector of the conventional ISOFIX fixing mechanism. The present invention not only increases the connection reliability of the child safety chair and the vehicle seat, but also effectively prevents connection of the engaging component 20 and the connecting component 220 of the vehicle seat from damage, so as to decrease the maintenance cost.

It should be mentioned that the said front end, the rear end, the right side and the left side are set according to reference structure shown in FIG. 4. The connecting component 220 of the vehicle seat can preferably be a retainer ring (or the connecting component with the other type), and detailed description is omitted herein for simplicity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fixing mechanism of a child safety chair, the fixing mechanism being disposed on a base of the child safety chair for connecting the child safety chair to a connecting component of a vehicle, the fixing mechanism comprising:

a connecting frame, an end of the connecting frame being connected to the base, a locking body being disposed on the other end of the connecting frame, and an opening being formed on the locking body;

an engaging component, an end of the engaging component pivoting to the connecting frame, a slotted hole being formed on a position of the engaging component different from a pivot center of the engaging component;

a driving component slidably disposed on the connecting frame and connected to the engaging component, the opening of the locking body being closed by the engaging component when the engaging component rotates into the locking body, and the opening of the locking body being opened by the engaging component when the driving component drives the engaging component to rotate out of the locking body, the driving component comprising a pushing portion and at least one buckling block, the pushing portion being fixed on the at least one buckling block and movably matched with the slotted hole, so as to rotate the engaging component to close or to open the opening by slide of the pushing portion relative to the slotted hole;

a first resilient component disposed between the driving component and the connecting frame, and the first resilient component being adapted to rotate the engaging component to close the opening on the locking body; and a second resilient component comprising a spring disposed on the connecting frame and adapted to push the engaging component to open the opening on the locking body, an end of the spring detachably contacting against the engaging component, wherein the engaging component is rotated to close the opening of the locking body while the spring is detached from the engaging component by the connecting component.

2. The fixing mechanism of claim 1, wherein a hook portion is disposed on the other end of the engaging component, and the first resilient component drives the hook portion to rotate into the locking body via the driving component so as to close the opening on the locking body.

3. The fixing mechanism of claim 2, wherein the first resilient component is disposed inside the driving component and comprises two opposite ends, a first contacting part is disposed on an end of the first resilient component to contact against the driving component, a second contacting part is disposed on the other end of the first resilient component to contact against the connecting frame, the first contacting part slides relative to the driving component in a sliding direction and is located between the locking body and the second contacting part.

4. The fixing mechanism of claim 3, wherein a sliding slot is formed on the driving component along the sliding direction, a boss is disposed on an inner wall of an end of the sliding slot, the boss stretches from the inner wall of the end of the sliding slot toward an inner space of the sliding slot, the connecting frame comprises a contacting portion, the first resilient component is disposed on the boss, the two opposite ends of the first resilient component respectively contact against the contacting portion and the inner wall of the end of the sliding slot.

5. The fixing mechanism of claim 2, wherein a side of the hook portion adjacent to the connecting component inside the locking body is an arc structure, a locking area is formed between the arc structure and a corresponding part of the engaging component, a side of the hook portion adjacent to the arc structure is inclined along a direction of the connecting component sliding into the locking area.

6. The fixing mechanism of claim 2, wherein the second resilient component is disposed on the connecting frame to constrain rotation of the engaging component, a first end of the second resilient component is connected to the connecting frame, and a second end of the second resilient component upwardly pushes the hook portion.

7. The fixing mechanism of claim 2, wherein a first end of the second resilient component is connected to the connecting frame, a second end of the second resilient component upwardly pushes the hook portion, the connecting component slides into the locking body to push the second end of the second resilient component, the driving component utilizes a resilient force of the first resilient component to drive the hook portion to rotate into the locking body so as to close the opening on the locking body, the driving component further overcomes the resilient force of the first resilient component to drive the hook portion to rotate out of the locking body so as to open the opening on the locking body, the connecting component slides out of the locking body, and the second end of the second resilient component recovers to upwardly push the hook portion.

8. The fixing mechanism of claim 7, wherein the connecting frame comprises a sheathing portion whereon the second resilient component is disposed, the sheathing portion is disposed on a side of the locking body opposite to the hook portion.

9. The fixing mechanism of claim 7, wherein the connecting frame pivots to the base, an accommodating space is formed inside the base to receive the connecting frame.

10. The fixing mechanism of claim 9, wherein the driving component, the engaging component, the first resilient component and the second resilient component are received inside the connecting frame, and an operative hole is formed on the connecting frame for operation of the driving component.

11. The fixing mechanism of claim 10, wherein the connecting frame comprises a first casing, a second casing and a fixing component with a hollow structure, an end of the fixing component is immovably disposed inside the first casing, the other end of the fixing component is immovably disposed inside the second casing, an end of the first casing pivots to the base, the other end of the first casing is connected to an end of the second casing, a first sliding chamber is disposed on the other end of the second casing, the driving component slidably inserts into the hollow structure of the fixing component, the driving component comprises an operating portion stretching into the first casing, the operative hole formed on the first casing corresponds to the operating portion, the first resilient component is connected between the fixing component and the driving component, a second sliding chamber is disposed on the fixing component and faces the first sliding chamber so that the first sliding chamber and the second sliding chamber forms the locking body, the engaging component is received inside the hollow structure and pivots to the fixing component, the second resilient component is received inside the hollow structure and disposed on a position of the fixing component adjacent to the second sliding chamber.

12. The fixing mechanism of claim 10, wherein the driving component comprises a first indicating component and a second indicating component, a window is formed on the connecting frame accordingly, so the first indicating component faces the window when the opening on the locking body is closed by the hook portion, and the second indicating component faces the window when the opening on the locking body is opened by the hook portion.

13. The fixing mechanism of claim 12, wherein the connecting frame comprises a first casing, a second casing and a fixing component with a hollow structure, an end of the fixing component is disposed inside the first casing, the other end of the fixing component is immovably disposed inside the second casing, an end of the first casing pivots to the base, the other end of the first casing is buckled with an end of the second casing, a first sliding chamber is disposed on the other end of the second casing, the driving component slidably inserts into the hollow structure of the fixing component, the driving component comprises an operating portion stretching into the first casing, the operative hole formed on the first casing corresponds to the operating portion, the window is formed on the second casing, the first resilient component is connected between the fixing component and the driving component, a second sliding chamber is disposed on the fixing component and faces the first sliding chamber so that the first sliding chamber and the second sliding chamber forms the locking body, the engaging component is received inside the hollow structure and pivots to the fixing component, the second resilient component is received inside the hollow structure and disposed on a position of the fixing component adjacent to the second sliding chamber.

14. The fixing mechanism of claim 1, wherein a rib is disposed on the driving component and stretches toward the engaging component, a positioning slot is formed on the engaging component accordingly, the rib slides into the positioning slot to constrain rotation of the engaging component when the opening on the locking body is closed by the engaging component, and the rib slides out of the positioning slot to release rotary constraint of the engaging component when the opening on the locking body is opened by the engaging component.

15. A fixing mechanism of a child safety chair, the fixing mechanism being disposed on a base of the child safety chair for connecting the child safety chair to a connecting component of a vehicle, the fixing mechanism comprising:
   a connecting frame, an end of the connecting frame being connected to the base, a locking body being disposed on the other end of the connecting frame, and an opening being formed on the locking body;
   an engaging component, an end of the engaging component pivoting to the connecting frame; and
   a driving component slidably disposed on the connecting frame;
   a first resilient component disposed between the driving component and the connecting frame to push the driving component; and
   a second resilient component comprising a spring disposed on the locking body of the connecting frame to push the engaging component away from the opening on the locking body by an end of the spring detachably contacting against the engaging component;
   wherein the engaging component is rotated by the first resilient component through the driving component into the opening of the locking body in one direction while the spring is detached from the engaging component by the connecting component and the engaging component is further rotated by the spring away from the opening of the locking body in another direction while the spring contacts the engaging component.

16. A fixing mechanism disposed on a base of a child safety chair, the fixing mechanism comprising:

a connecting frame, an end of the connecting frame being connected to the base, a locking body being disposed on the other end of the connecting frame, and an opening being formed on the locking body;

an engaging component, an end of the engaging component pivoting to the connecting frame; and a driving component slidably disposed on the connecting frame and connected with the engaging component;

a first resilient component disposed between the driving component and the connecting frame to push the driving component; and a second resilient component comprising a spring disposed on the locking body of the connecting frame to push the engaging component away from the opening on the locking body by an end of the spring detachably contacting against the engaging component;

wherein the engaging component is rotated into the opening of the locking body in one direction by the first resilient component while the spring does not contact the engaging component, and the engaging component is rotated away from the opening of the locking body in another direction while the spring contacts the engaging component.

* * * * *